United States Patent
Scheer et al.

(10) Patent No.: US 12,491,998 B2
(45) Date of Patent: Dec. 9, 2025

(54) TRAY CONNECTIONS FOR CONVERTIBLE AIRCRAFT CARGO HANDLING SYSTEM

(71) Applicant: Goodrich Corporation, Charlotte, NC (US)

(72) Inventors: Dustin P. Scheer, Jamestown, ND (US); Wesley K. Stegmiller, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 791 days.

(21) Appl. No.: 17/845,736

(22) Filed: Jun. 21, 2022

(65) Prior Publication Data

US 2023/0406503 A1    Dec. 21, 2023

(51) Int. Cl.
*B64D 9/00*    (2006.01)

(52) U.S. Cl.
CPC .......... *B64D 9/00* (2013.01); *B64D 2009/006* (2013.01)

(58) Field of Classification Search
CPC .... B64D 9/00; B64D 2009/006; B64D 9/003; B64D 1/10; B64D 2011/0046; B60P 7/13; B60P 7/0815; B60P 7/0807; B60P 7/08; B60P 1/52; B64C 1/20; B65G 2207/30
USPC ........................................................... 410/2
See application file for complete search history.

(56) References Cited

U.S. PATENT DOCUMENTS

| | | | |
|---|---|---|---|
| 7,344,013 B2 | 3/2008 | Krueger | |
| 7,926,762 B2 | 4/2011 | Oetken et al. | |
| 9,663,231 B2 | 5/2017 | Koncz | |
| 10,377,572 B1 * | 8/2019 | Meidinger | B65G 21/2072 |
| 10,399,661 B2 | 9/2019 | Lampe | |
| 10,787,260 B2 | 9/2020 | Scheer et al. | |
| 11,401,023 B2 | 8/2022 | Spry et al. | |
| 11,535,359 B2 | 12/2022 | Stegmiller et al. | |
| 11,542,005 B2 | 1/2023 | Scheer et al. | |
| 2006/0243861 A1 | 11/2006 | Krueger | |
| 2007/0095978 A1 | 5/2007 | Oetken | |
| 2011/0127795 A1 | 6/2011 | Dunphy | |
| 2012/0304579 A1 | 12/2012 | Dezoete | |
| 2019/0210728 A1 * | 7/2019 | Pfau | B64D 9/003 |
| 2019/0276148 A1 | 9/2019 | Huber et al. | |
| 2020/0239122 A1 | 7/2020 | Scheer et al. | |
| 2020/0239123 A1 | 7/2020 | Stegmiller et al. | |

(Continued)

FOREIGN PATENT DOCUMENTS

| | | | |
|---|---|---|---|
| CN | 116409455 A | * | 7/2023 |
| EP | 0894713 | | 2/1999 |

(Continued)

OTHER PUBLICATIONS

European Patent Office, European Office Action dated Mar. 25, 2025 in Application No. 23180443.6.

(Continued)

*Primary Examiner* — Amy R Weisberg
*Assistant Examiner* — Philip Charles Adams
(74) *Attorney, Agent, or Firm* — SNELL & WILMER L.L.P.

(57) ABSTRACT

A tray connector is disclosed herein. The tray connector includes a first side rail, a second side rail, parallel to the first side rail, a cross member extending from the first side rail to the second side rail, a pin extending from within the cross member and through the first side rail, and a tab configured to retract the pin.

15 Claims, 15 Drawing Sheets

(56) References Cited

U.S. PATENT DOCUMENTS

| | | |
|---|---|---|
| 2021/0261041 A1 | 8/2021 | Shivalinga et al. |
| 2021/0354828 A1 | 11/2021 | Nuessen et al. |
| 2022/0003863 A1 | 1/2022 | Habib |
| 2022/0281603 A1 | 9/2022 | Rowles et al. |
| 2022/0380018 A1 | 12/2022 | Kohler |

FOREIGN PATENT DOCUMENTS

| | | |
|---|---|---|
| EP | 2441668 | 4/2012 |
| EP | 3640145 | 4/2020 |
| EP | 3680166 | 9/2021 |
| FR | 2930745 | 11/2009 |
| WO | 2016150891 | 9/2016 |

OTHER PUBLICATIONS

USPTO; Notice of Allowance dated Apr. 14, 2025 in U.S. Appl. No. 18/311,847.

European Patent Office, European Search Report dated Oct. 31, 2023 in Application No. 23180443.6.

European Patent Office, European Search Report dated Sep. 16, 2024 in Application No. 24173684.2.

USPTO; Non-Final Office Action dated Oct. 8, 2024 in U.S. Appl. No. 18/311,847.

\* cited by examiner

TRAY CONNECTIONS FOR CONVERTIBLE AIRCRAFT CARGO HANDLING SYSTEM

FIELD

The present disclosure generally relates cargo handling systems, and more specifically, to quick-connect fittings for convertible cargo handling assemblies.

BACKGROUND

Today's rapidly evolving and uncertain world has driven the need for increased flexibility and modularity into modern aircraft cargo handling systems. The response to these requirements has led to the development of many "convertible" cargo handling systems that can be easily reconfigured to handle many different mission profiles including bulk cargo, passengers, containerized cargo, additional fuel tanks, etc. One typical implementation of this type of system utilizes discrete floor fittings attached to aircraft structure to provide standardized quick-attach interfaces for the cargo system components.

SUMMARY

A tray connector is disclosed herein. The tray connector includes a first side rail, a second side rail, parallel to the first side rail, a cross member extending from the first side rail to the second side rail, a pin extending from within the cross member and through the first side rail, and a tab configured to retract the pin. In various embodiments, the tray connector further includes a base including a base plate and a side structure and a hole formed in the side structure and configured to receive the pin. In various embodiments, the tray connector further includes a second cross member extending from the first side rail to the second side rail and a second pin extending from within the second cross member, through the first side rail, and into the hole, wherein the first side rail pivots about the second cross member. In various embodiments, the tab is a spring-loaded tab biasing the pin to the extended position.

In various embodiments, the tray connector further includes a second cross member extending from the first side rail to the second side rail, the second cross member being disposed vertically lower on the first side rail than the cross member. In various embodiments, the tray connector further includes an inside portion, an outside portion, and a top portion connecting the inside portion and the outside portion, wherein there is a gap between the inside portion and the outside portion. In various embodiments, the tray connector further includes a second pin extending from within the cross member and through the second side rail.

Also disclosed herein is a cargo handling system. The cargo handling system includes a first tray having a first end, a second tray having a second end, and a connector configured the connect the first end to the second end. The connector includes a first side rail, a second side rail, parallel to the first side rail, a cross member extending between the first side rail and the second side rail, a pin extending from within the cross member and through the first side rail, and a tab configured to retract the pin.

In various embodiments, the cargo handling system further includes a base including a base plate and a side structure, the base plate disposed between a first side wall and an opposing second side wall of the first tray and a hole in the side structure configured to receive the pin. In various embodiments, the cargo handling system further includes a hole in a sidewall of the first tray, wherein the pin is configured to extend through the hole. In various embodiments, the connector further includes a second cross member extending from the first side rail to the second side rail, the second cross member disposed vertically below the cross member and a second pin extending from within the second cross member and through a first side wall.

In various embodiments, the cargo handling system further includes a second hole in the sidewall of the first tray, the second hole being disposed vertically below the hole, wherein the second pin is configured to extend through the second hole. In various embodiments, the first side rail further includes an inside portion, an outside portion, and a top portion connecting the inside portion and the outside portion, the first side rail configured to straddle a sidewall of the first tray.

In various embodiments, the connector further includes a second cross member extending from the first side rail to the second side rail and a second pin extending from within the second cross member and through the first side rail, wherein the pin is configured to lock into the first tray and the second pin is configured to lock into the second tray.

Also disclosed herein is a cargo handling system. The cargo handling system includes a first tray having a first end, a second tray having a second end and a connector configured to connect the first end to the second end. The connector includes a first base structure coupled to a sidewall of the first tray, a second base structure coupled to a sidewall of the second tray, and a side rail having a first end and a second end, the first end coupled to the first base structure and the second end releasably coupled to the second base structure.

In various embodiments, the connector further includes a cross member orthogonally coupled to the side rail and a pin extending from the cross member, through the side rail, and into the second base structure. In various embodiments, the cargo handling system further includes a support rod extending between the sidewall of the first tray and an opposing second sidewall of the first tray.

In various embodiments, the cargo handling system further includes a third base structure coupled to a second sidewall of the second tray, the second sidewall of the second tray opposing the sidewall of the second tray and a second side rail coupled to the third base structure, the cross member extending from the second side rail to the side rail.

In various embodiments, the connector further includes a second pin extending from within the cross member, through the second side rail, and into the third base structure. In various embodiments, the connector further includes a first spring-loaded tab configured to retract the pin into the cross member and a second spring-loaded tab configured to retract the second pin into the cross member.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings

DETAILED DESCRIPTION

Figure 1:
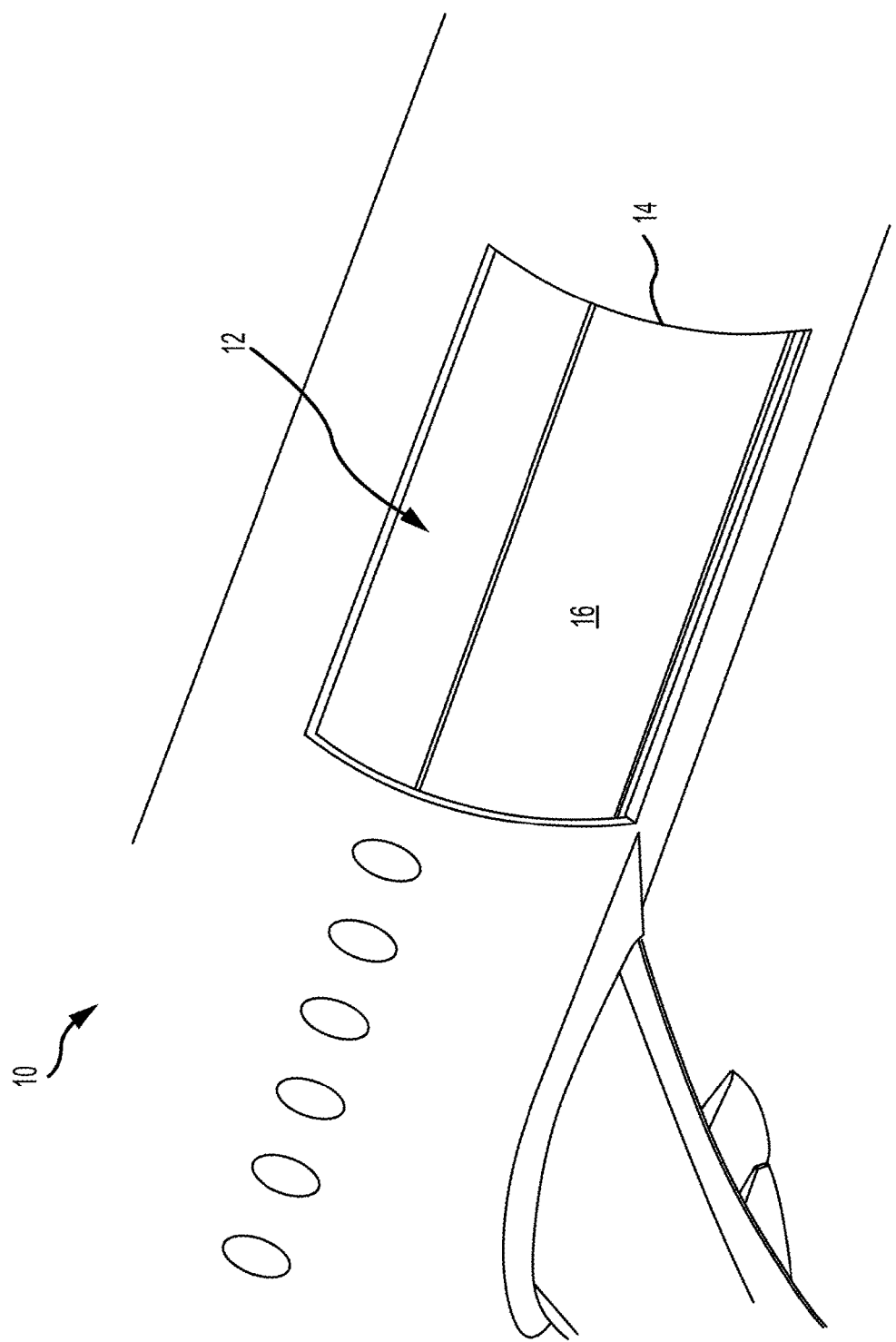
FIG. 1 illustrates a perspective view of an aircraft cargo compartment, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Convertible cargo handling assemblies, as disclosed herein, generally include floor fittings that are flush with the floor panels to prevent snagging of the bulk cargo when the containerized cargo system is removed and to allow for quick and modular replacement of components in the containerized cargo configuration. These fittings also provide the added benefit of allowing interfaces from an existing non-convertible cargo handling system to be used for the installation of a convertible system in an aftermarket retrofit.

Despite these benefits, using floor fittings as the interface for components does not provide the most optimal method of transferring loads between adjacent system components. Generally, current system configurations do not transfer the cargo load directly between components (e.g., rails), but rather transfer the cargo load through the quick-attach interfaces to the floor fitting and then back through the quick-attach interfaces to the adjacent component. For example, two cargo tray sections including rollers, power drive units, and cargo restraints may be placed end to end to create a longer cargo tray section. The two cargo tray sections are then coupled together using quick release fittings. However, current connection mechanisms do not provide a robust load path for forces or moments (torques) to be transferred to the adjacent tray as the floor fitting is relatively thin and the quick-attach interfaces have considerable play in them due to tolerances.

Another disadvantage of this connection scheme is that some or all of the forces or moments could be transferred into the aircraft structure rather than being transferred into the adjacent component (e.g., tray). This is especially a problem in an aftermarket retrofit situation where the existing interface that is being used may not have been designed to handle those loads.

One solution current art solution to this problem could be to tie the two trays together with a hard splice (a member or members that are fixed attached to both components across the joint), but using hard fasteners (bolts, rivets, etc.) precludes a quick and easy removal of the tray sections. Another problem with a hard splice is that often the trays must be removed in a defined sequence due to how the quick-attach interfaces are designed. Sometimes the tray to be removed slides laterally (e.g., side-to-side of the aircraft) to disengage the quick-attach interface to then be lifted vertically and out of the system. Other times the tray to be removed slides longitudinally (e.g., for or aft of the aircraft) to disengage the quick-attach interface.

Disclosed herein are several implementations of a quick-attach splice that efficiently transfers loads between two cargo trays (or other cargo components). Various embodiments include finger-actuated and spring-loaded mechanisms to engage/disengage slide pins to quickly connect/disconnect the splice. In various embodiments, tabs are pinched together to disengage the slide pins. In various embodiments, where two sets of tabs are located close together, they could easily be combined into one component to facilitate easier actuation by one hand.

With reference to FIG. 1, in accordance with various embodiments, an aircraft 10 having a cargo compartment 12 is illustrated. A cargo door 14 provides access to cargo compartment 12. Cargo (e.g., pallet, ULDs, and/or bulk cargo) may be loaded and unloaded through cargo door 14 and onto a cargo deck 16.

Figure 2A:
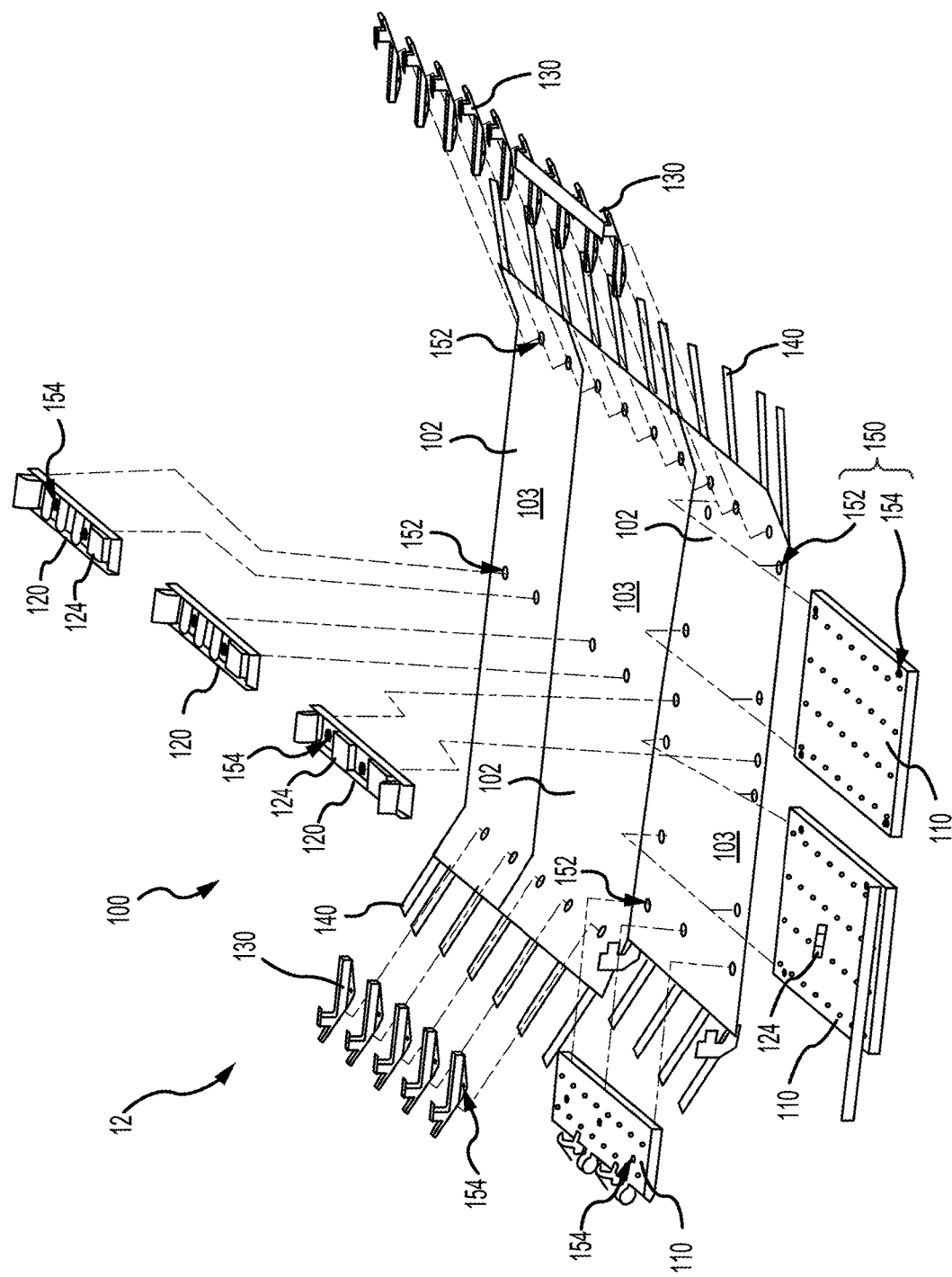
FIG. 2A illustrates an assembly view of a convertible cargo handling assembly, in accordance with various embodiments.
Figure 2B:
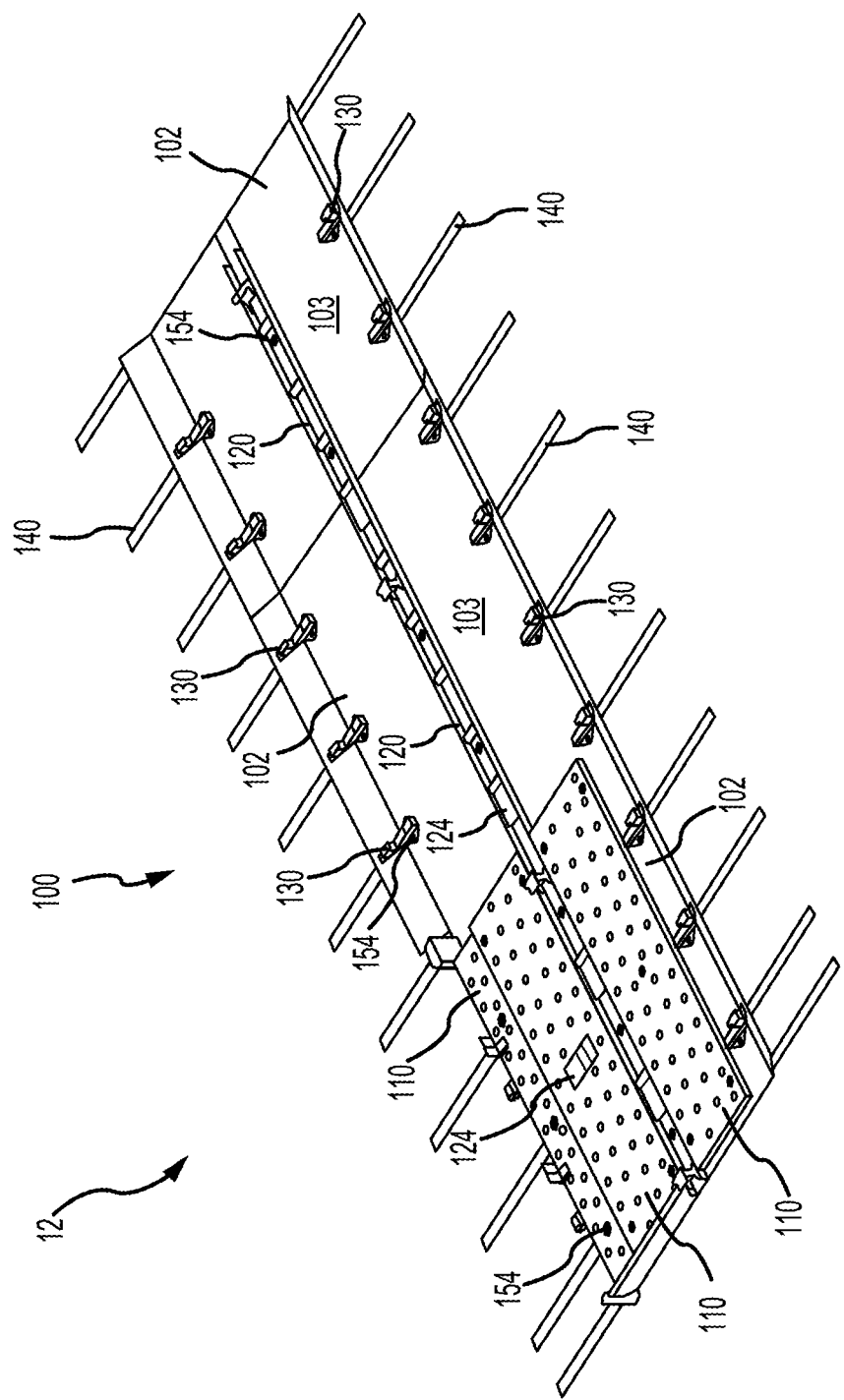
FIG. 2B illustrates a convertible cargo handling assembly configured for handling containerized cargo, in accordance with various embodiments.

With reference to FIGS. 2A and 2B, a convertible cargo handling assembly 100, which may be located within cargo compartment 12, is illustrated. In accordance with various embodiments, convertible cargo handling assembly 100 may be converted between a containerized mode (FIG. 2B), configured to handle containerized cargo, and a bulk mode for handling bulk cargo items individually. Convertible cargo handling assembly 100 comprises a plurality of floor panels, or panels 102. Panels 102 may line cargo compartment 12. For example, panels 102 are located along the floor and walls of cargo compartment 12. Panels 102 are located over aircraft frame structures 140. In this regard, panels 102 may form cargo deck 16, with momentary reference to FIG. 1. In various embodiments, convertible cargo handling assembly 100 includes components configured to facilitate translation of containerized cargo over panels 102. For example, convertible cargo handling assembly 100 may include ball mats 110, roller trays 120, and guide rails 130. Ball mats 110 may be located proximate cargo door 104, with momentary reference to FIG. 1. Convertible cargo handling assembly 100 may be equipped with one or more power drive units (PDUs) 124 configured to propel containerized cargo in a desired direction. PDUs 124 may be located in roller trays 120 and/or in ball mats 110. In various embodiments, PDUs 124 may be mounted inside of their own, separate structure, outside of ball mats 110 and roller trays 120. As discussed in further detail below, ball mats 110, roller trays 120, and guide rails 130 are each removably coupled to aircraft frame structures 140 via one or more quick-connect fitting(s) 150.

Quick-connect fittings 150 each include a fixed portion 152 attached to an aircraft frame structure 140 and one or more coupling component(s) 154 attached to a removable cargo handling component (i.e., attached to a ball mat 110, a roller tray 120, or a guide rail 130). In various embodiments, fixed portion 152 may include a series of seat track rails that are installed flush with panels 102 providing a similar interface as quick-connect fittings 150 in long continuous rails instead of discrete fittings. The coupling components 154 may rotate relative to, axially engage, slide in to, or form a threaded engagement with, the fixed portions 152 to secure ball mats 110, roller trays 120, and guide rails 130 to fixed portions 152 and aircraft frame structures 140. Fixed portions 152 are located within openings defined by mats 102. When convertible cargo handling assembly 100 is in a containerized mode (FIG. 2B), ball mats 110, roller trays 120, and guide rails 130 are attached to fixed portions 152. When convertible cargo handling assembly 100 is in the containerized mode, at least a portion of each ball mat 110, roller tray 120, and guide rails 130 is located on and/or overlaps surface 103 of mats 102. When convertible cargo handling assembly 100 is in a bulk mode, ball mats 110, roller trays 120, and guide rails 130 are removed from cargo compartment 12, while fixed portions 152 and mats 102 remain attached. In various embodiments, ball mats 110, roller trays 120, and guide rails 130 are secured to aircraft frame structures 140 independently of one another. Stated differently, each ball mat 110, roller tray 120, and guide rail 130 is secured via its own dedicated quick-connect fitting 150, as opposed to via a coupling to an adjacent ball mat 110, roller tray 120, and/or guide rail 130. In various embodiments, ball mats 110, roller trays 120, and/or guide rails 130 may be secured to aircraft frame structures 140 solely via quick-connect fittings 150.

Figure 3A:
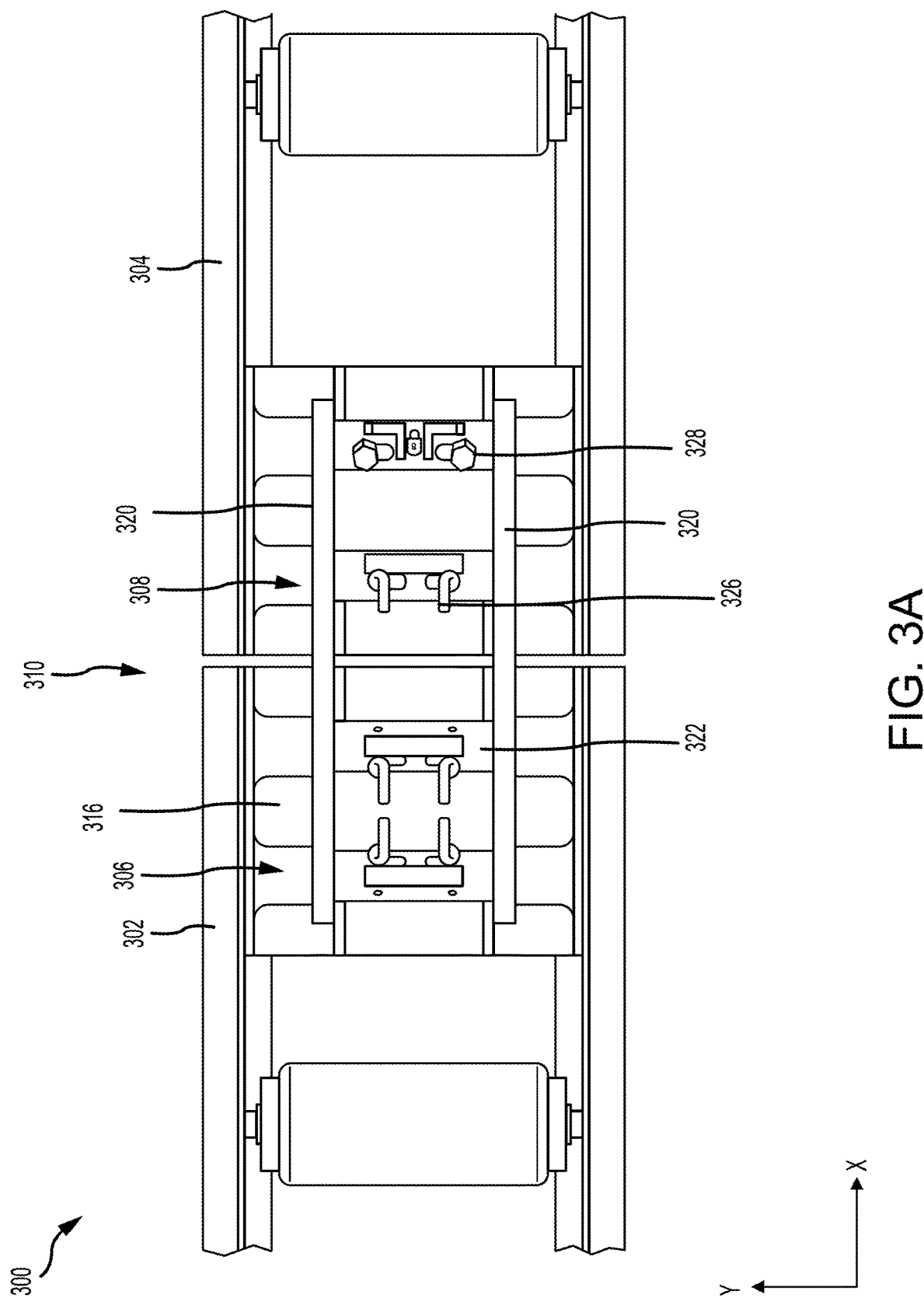
FIGS. 3A, 3B, and 3C illustrate a quick attach splice for a convertible cargo handling assembly, in accordance with various embodiments.
Figure 3B:
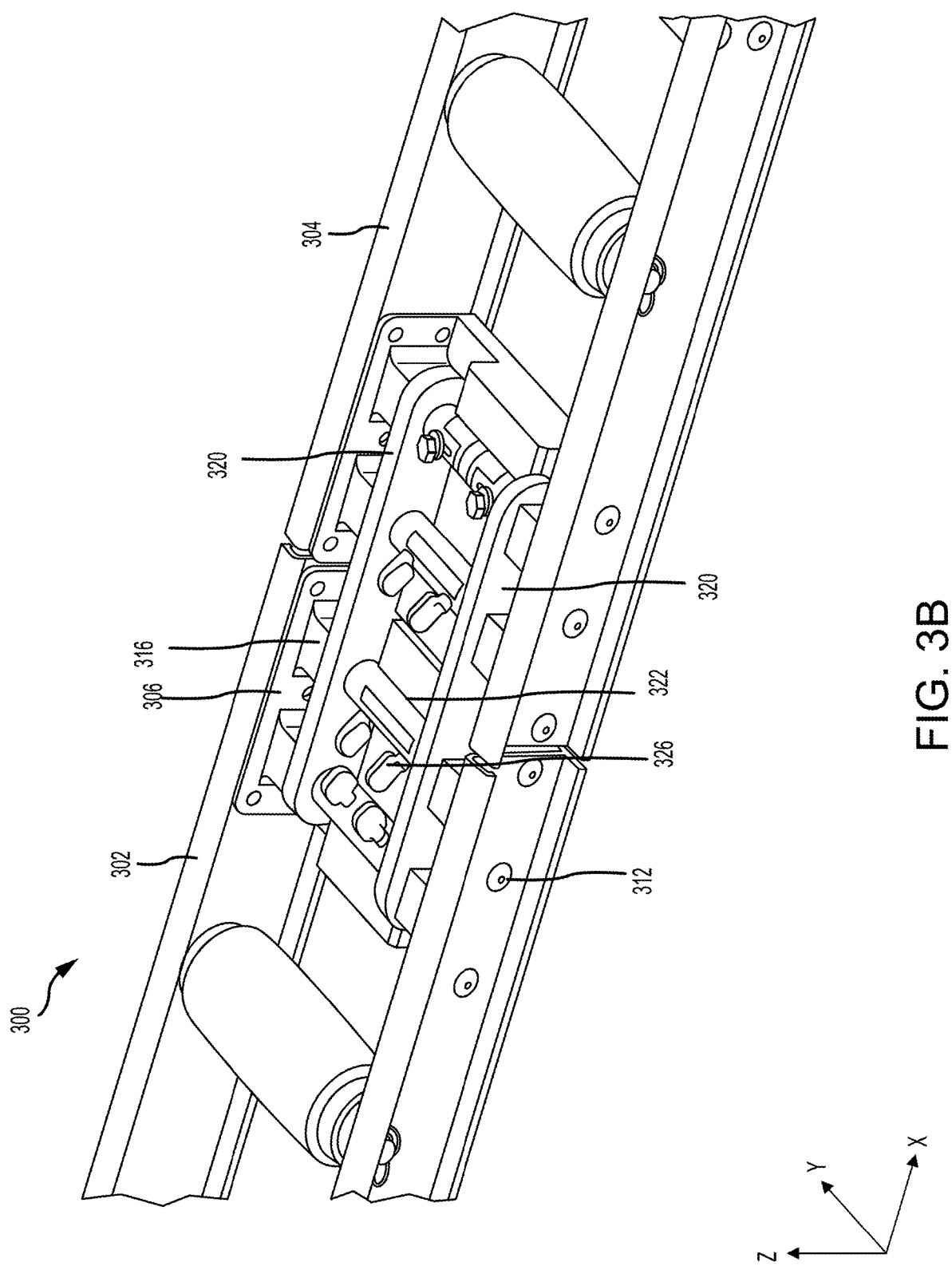
Figure 3C:
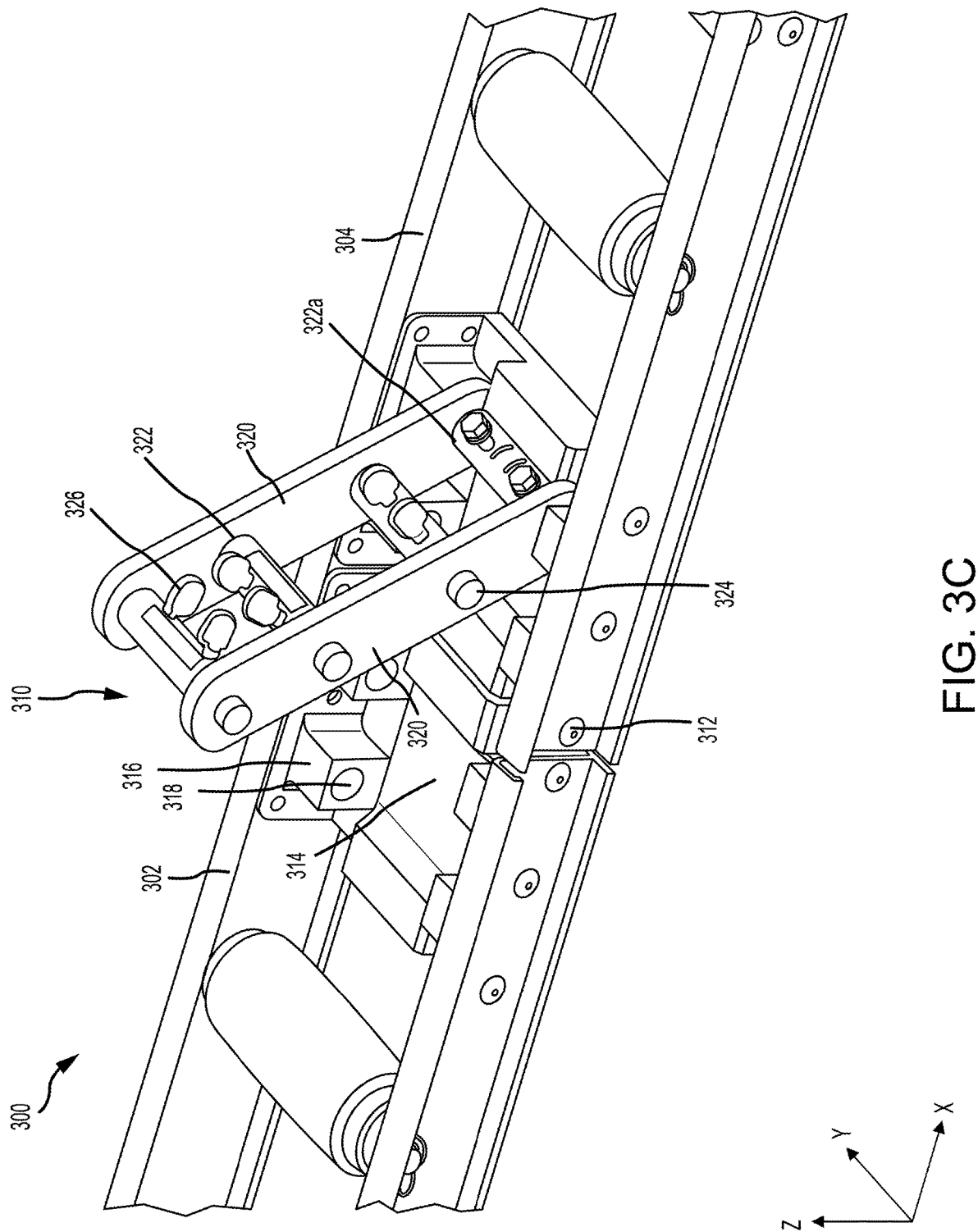

Referring now to FIGS. 3A-3C, in accordance with various embodiments, a quick-attach splice 300 is illustrated. Quick-attach splice 300 may be used in conjunction with or instead of quick connect fittings 150 described above. As depicted, a first roller tray 302 and a second roller tray 304 are placed end to end to form a longer roller tray section in a longitudinal direction (e.g., the x-axis). First and second roller trays 302, 304 may be examples of roller trays 120 described above with respect to FIGS. 2A and 2B. Quick-attach splice 300 includes a first base 306, a second base 308, and a pivoting splice 310. First base 306 and second base 308 are secured to first tray 302 and second tray 304, respectively, by fasteners 312. Fasteners 312 may be rivets, bolts, screws, or other types of fasteners. First base 306 and second base 308 include a base plate 314, one or more structures 316, and a hole 318 in each structure 316. In various embodiments, first base 306 may be permanently affixed to first tray 302 and second base 308 may be permanently affixed to second tray 304.

Pivoting splice 310 includes side rails 320, one or more cross members 322, pins 324, and tabs 326. Side rails 320 extend parallel to first and second trays 302 and 304 (e.g., in the x-axis). Cross members 322 extend between side rails 320, from one side rail 320 to the other side rail 320. Each pin 324 extends from within one cross member 322, through one side rail 320, and past side rail 320 (e.g., in the y-axis). Each pin 324 is aligned with structure 316, and more specifically, with hole 318 in each structure 316, as illustrated in FIGS. 3A and 3B. This is the locked, or lowered, position of the pivoting splice 310 of the quick-attach splice 300. By being affixed to the first tray 302 and second tray 304, respectively, first and second base 306, 308 keep the tray walls of first and second trays 302, 304 from bowing apart under load, which could cause pins 324 to become disengaged from holes 318. Additionally, first and second based 306, 308 provide a distributed load path from the slide pins 324 to the tray wall of first and second trays 302, 304. When locked, first tray 302 and second tray 304 are firmly connected allowing forces to pass from first tray 302 to second tray 304, and vice-versa, providing improved structural integrity and support. Additionally, first tray 302 and second tray 304 may be connected using quick-attach splice 300 at any point within cargo compartment 12 and along cargo deck 16 because all connections are located within first and second trays 302, 304 and do not use a floor fitting.

Cross member 322 further includes tabs 326. Tabs 326 are configured to retract pin 324 into cross member 322 when pulled toward the center of cross member 322 (e.g., in the y-direction). Each pair of tabs 326 may be pulled together, toward the center of cross member 322 to retract the associate pins 324 from holes 318. Tabs 326 are spring-loaded and biased away from the center of cross member 322, that is, away from each other. This keeps pins 324 secured in holes 318 when locked. After retracting pins 324, pivoting splice 310 may pivot about cross member 322a to move into the unlocked, or raised, position, as illustrated in FIG. 3C. Pins 324 in cross member 322a are secured in place by fasteners 328. Fasteners 328 may be screws, bolts, or other removable fasteners. In various embodiments, fasteners 328 may be replaced with tabs 326 so that all cross members 322 include tabs 326. In such embodiments, pivoting splice 310 may be easily removed from both first and second trays 302, 304. In various embodiments, one or more of tabs 326 on pins 322 may be replaced with tool operated pins, similar to pin 322a using fasteners 328.

As illustrated in FIG. 3C, after unlocking quick-attach splice 300, first tray 302 may be removed. First tray 302 may be moved laterally (e.g., the y-direction) or longitudinally (e.g., the x-direction) before being removed. Similarly, second tray 304 may be moved laterally (e.g., the y-direction) or longitudinally (e.g., the x-direction) before being removed.

Figure 4A:
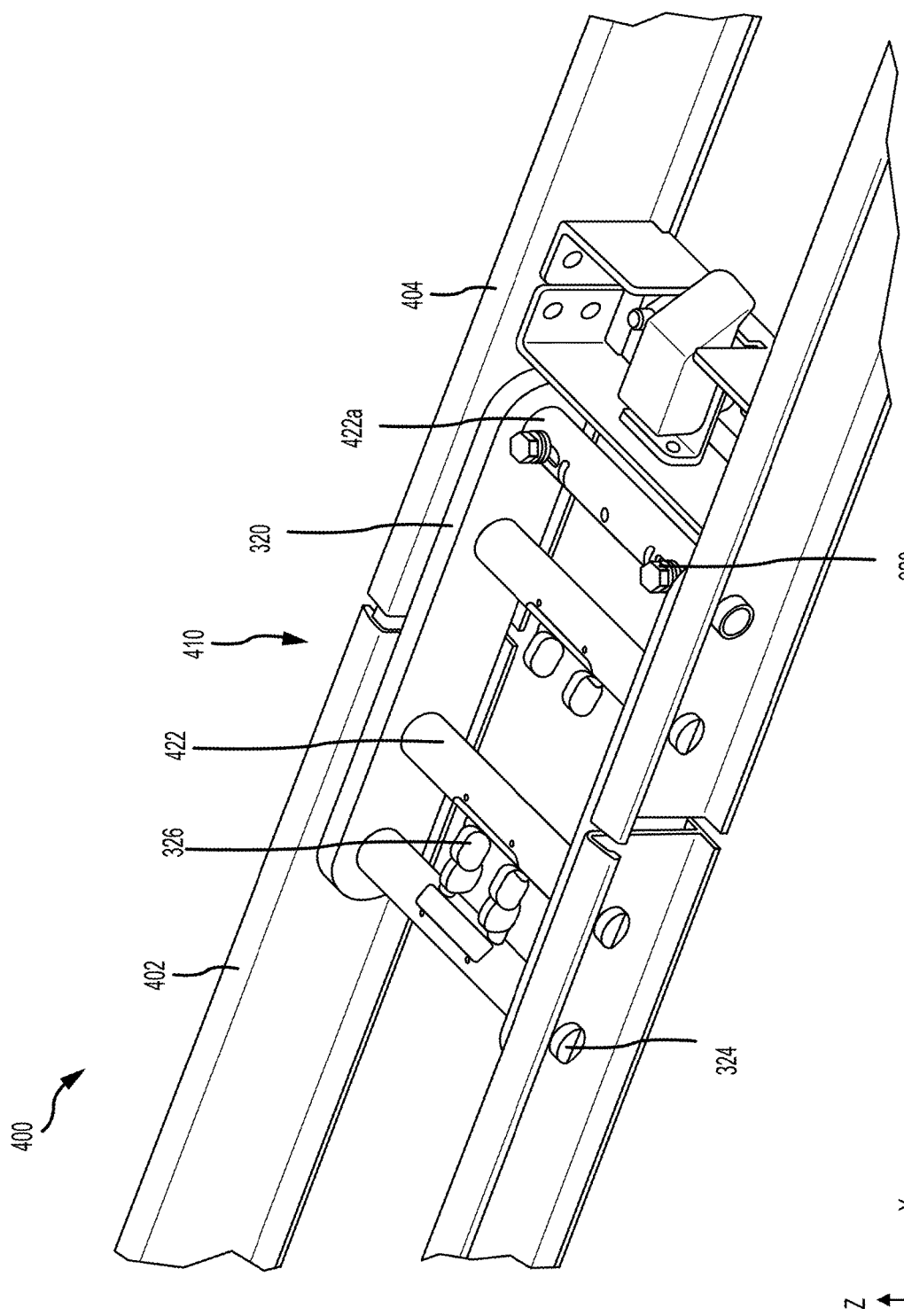
FIGS. 4A and 4B illustrate a quick attach splice for a convertible cargo handling assembly, in accordance with various embodiments.
Figure 4B:
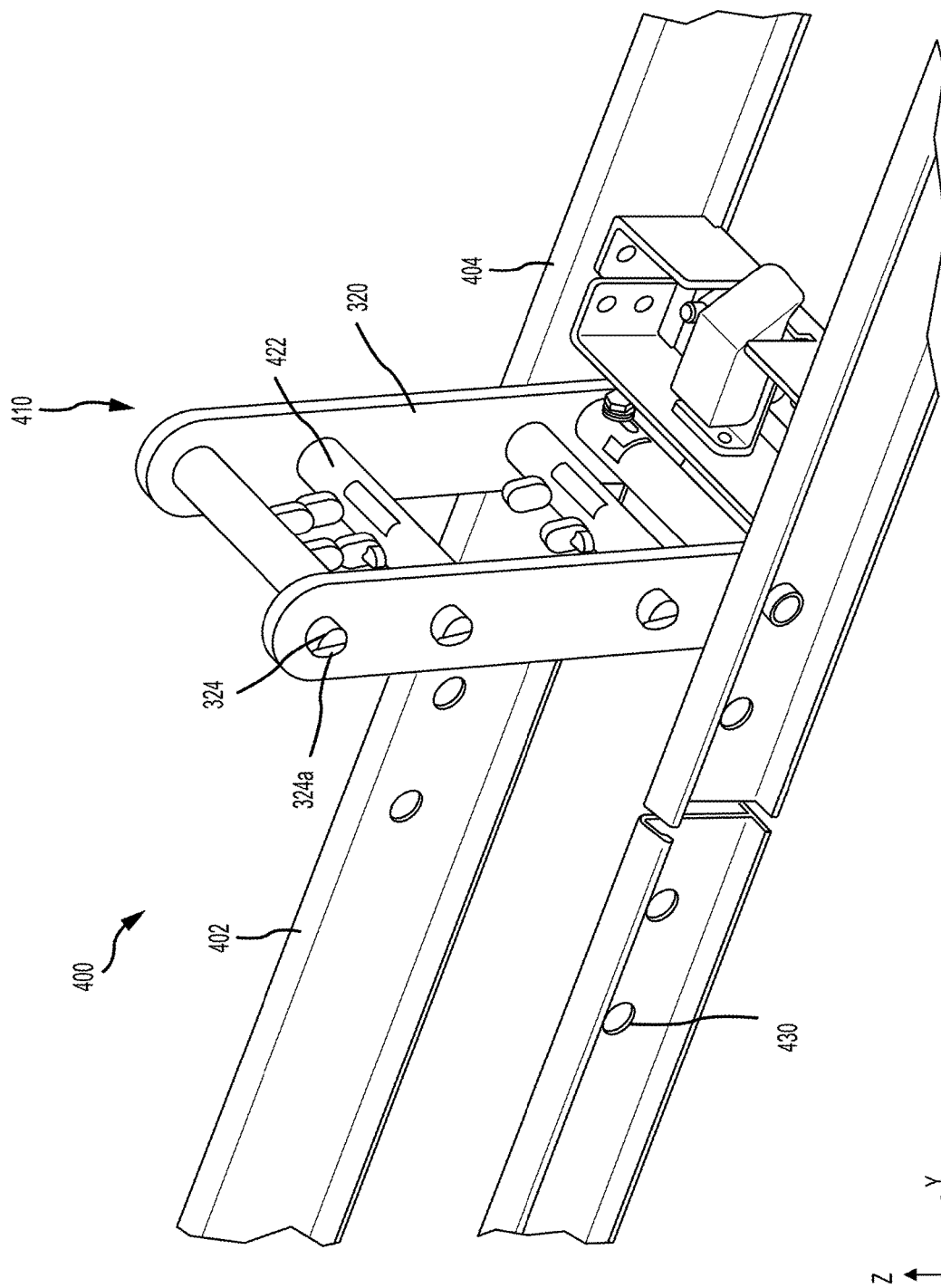

Referring now to FIGS. 4A and 4B, in accordance with various embodiments, a quick-attach splice 400 is illustrated. Quick-attach splice 400 includes similar components as those described above with respect to quick-attach splice 300 with respect to FIGS. 3A-3C, including first tray 402, second tray 404, side rails 420, cross members 422, pins 324, and tabs 326. Therefore, for simplicity, descriptions of similar components may not be repeated here in the description of quick-attach splice 400.

While side rails 420 are similar to side rails 320 described above with respect to FIGS. 3A-3C, side rails 420 are spaced further apart in the y-direction than side rails 320. Similarly, cross members 422 are longer in the y-direction than cross members 322 described above. Quick-attach splice 400 does not include a base member for securing side rails 420 and pins 324. Instead, quick-attach splice 400 includes holes 430 in first and second trays 402, 404. Holes 430 are positioned to receive pins 324 as they extend from cross members 422 and through side rails 420. Pins 324 extend through holes 430, ensuring that pins 324 remain securely within holes 430 if bowing of first tray 402 or second tray 404 occurs. In various embodiments, pins 324 include a chamfer 324a along a lower portion (e.g., the z-direction) so that pins 324 retract when pivoting splice 410 is pressed downward (e.g., the negative z-direction). Chamfer 324a may be present in any embodiment disclosed herein. Similar to pivoting splice 310, pivoting splice 410 includes four cross members 422, four sets of retractable pins, three sets of tabs 326, and one set of fasteners 328. Fasteners 328 semi-permanently secure pivoting splice 410 to second tray 404, allow pivoting splice 410 to rotate about cross member 422a to unlock, or raise, and lock, or lower.

Other aspects of quick-attach splice 400 are similar to quick-attach splice 300. For example, pivoting splice 410 is unlocked by pressing each pair of tabs 326 toward the center of cross members 422 and rotating pivoting splice 410 upward. When unlocked, pivoting splice 410 allows first tray 402 to slide laterally (e.g., the y-direction) away from second tray 404 to be removed.

Figure 5A:
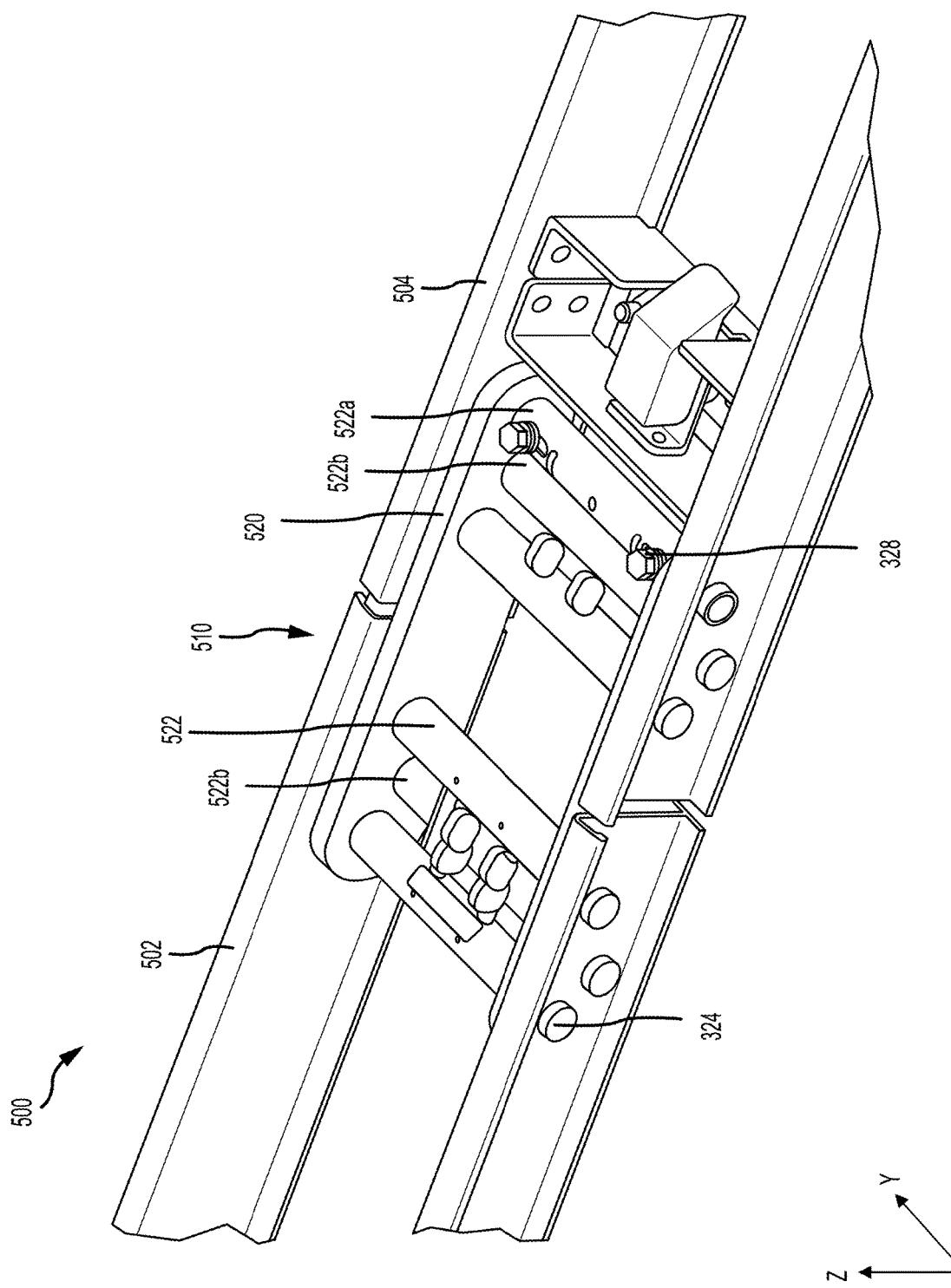
FIGS. 5A, 5B, and 5C illustrate a quick attach splice for a convertible cargo handling assembly, in accordance with various embodiments.
Figure 5B:
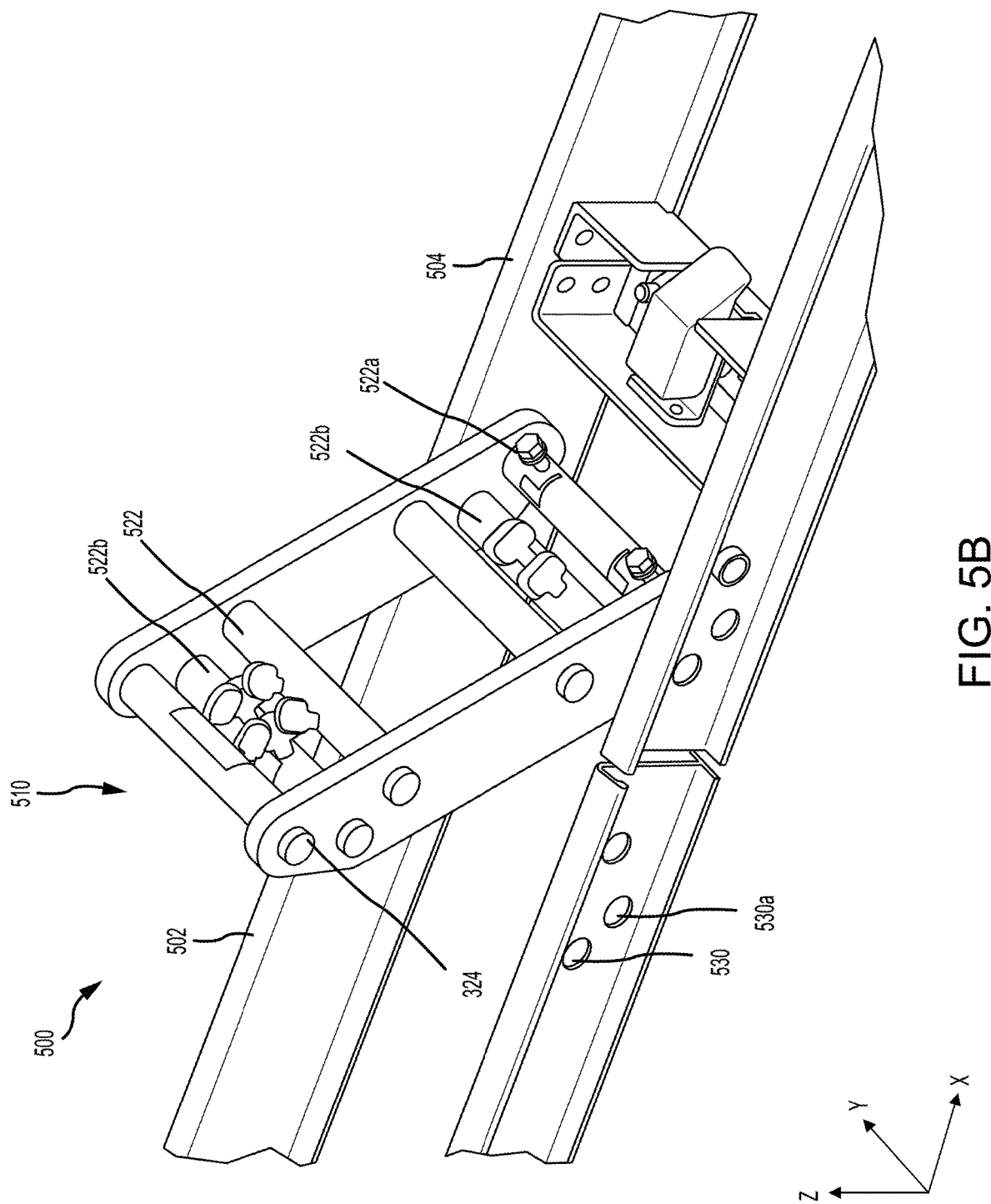
Figure 5C:
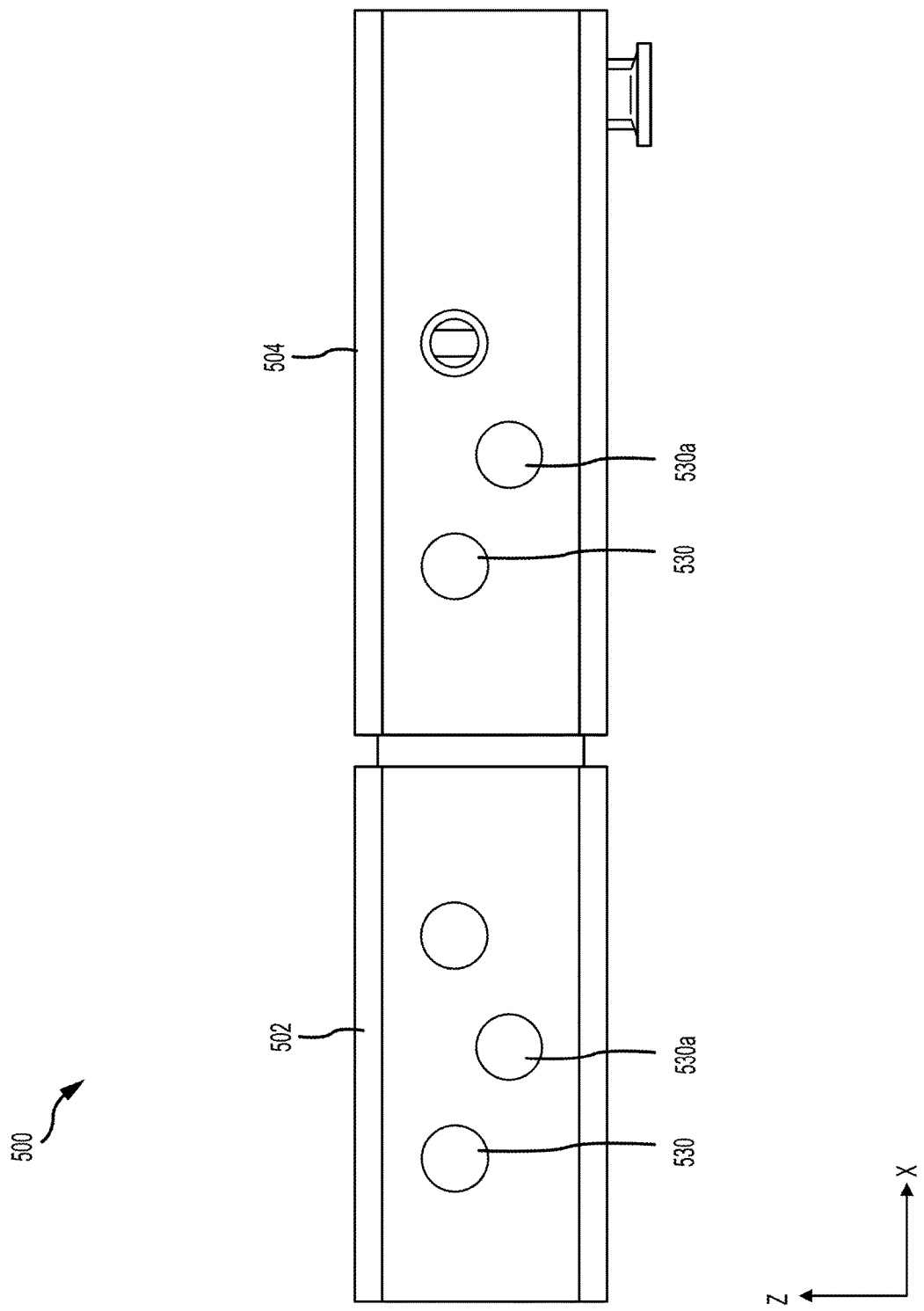

Referring now to FIGS. 5A-5C, in accordance with various embodiments, a quick-attach splice 500 is illustrated. Quick-attach splice 500 includes similar components as those described above with respect to quick-attach splice 400 with respect to FIGS. 4A and 4B, including first tray 502, second tray 504, side rails 520, cross members 522, pins 324, and tabs 326. Therefore, for simplicity, descriptions of similar components may not be repeated here in the description of quick-attach splice 500.

As depicted, quick-attach splice 500 includes six cross members 522, six pairs of pins 324, five pairs of tabs 326, and one pair of fasteners 328. First tray 502 and second tray 504 each include three pairs of holes 530. Holes 530 are configured in a triangular arrangement with the center hole 530a being lower (e.g., the negative z-direction) on the first and second trays 502, 504 than the other holes 530. Similarly, cross member 522b is lower (e.g., the negative z-direction) on side rails 520 than cross members 522, 522a. Side rails 520 are taller (e.g., taller in the z-axis when in the lower position) than side rails 420, 320 to accommodate cross members 522b. Additional cross members 522 and additional pins 324 provide additional structural support to first and second trays 502, 504 and improve the transfer of forces from first tray 502 to second tray 504, and vice-versa, as compared to existing systems.

Figure 6A:
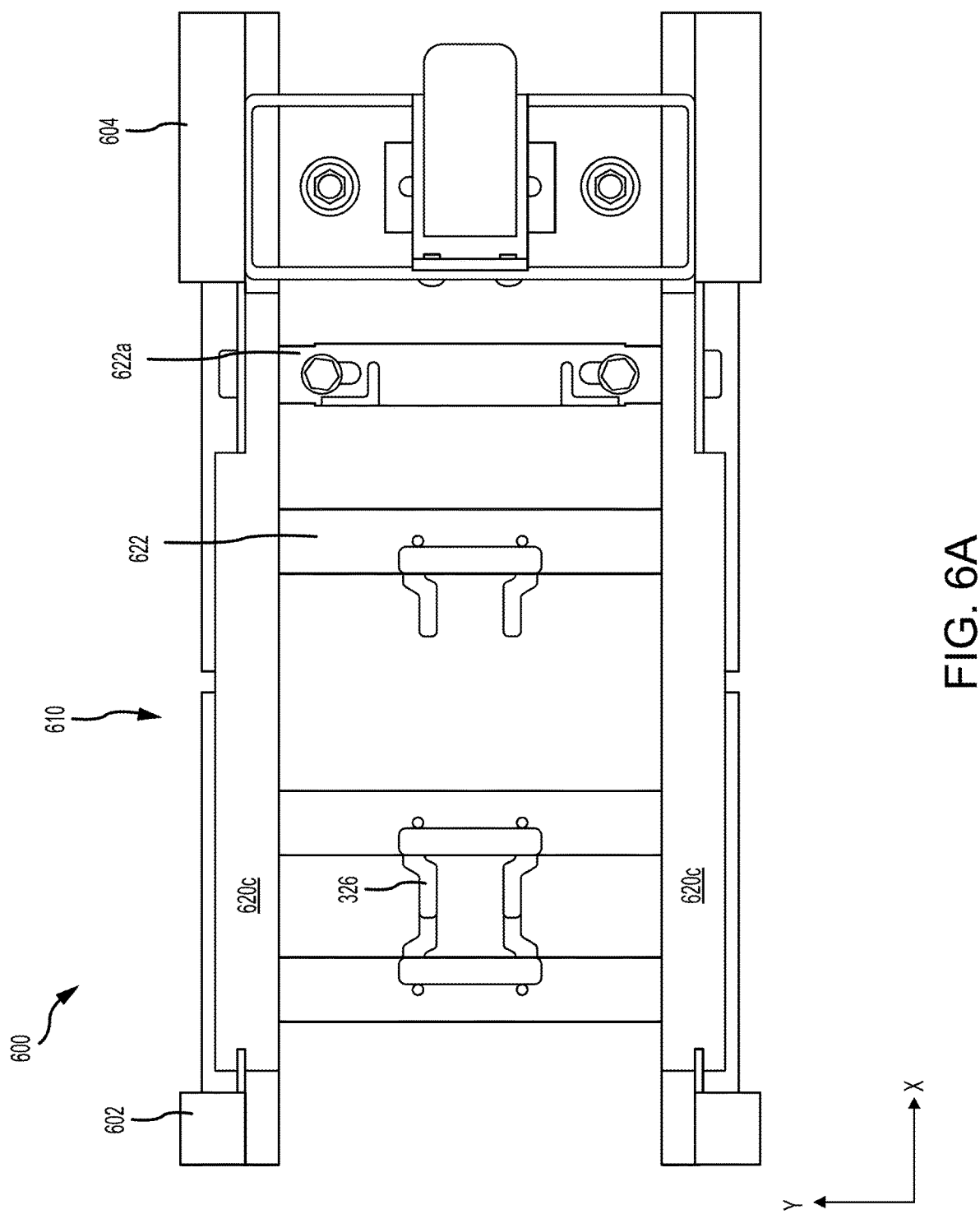
FIGS. 6A, 6B, and 6C illustrate a quick attach splice for a convertible cargo handling assembly, in accordance with various embodiments.
Figure 6B:
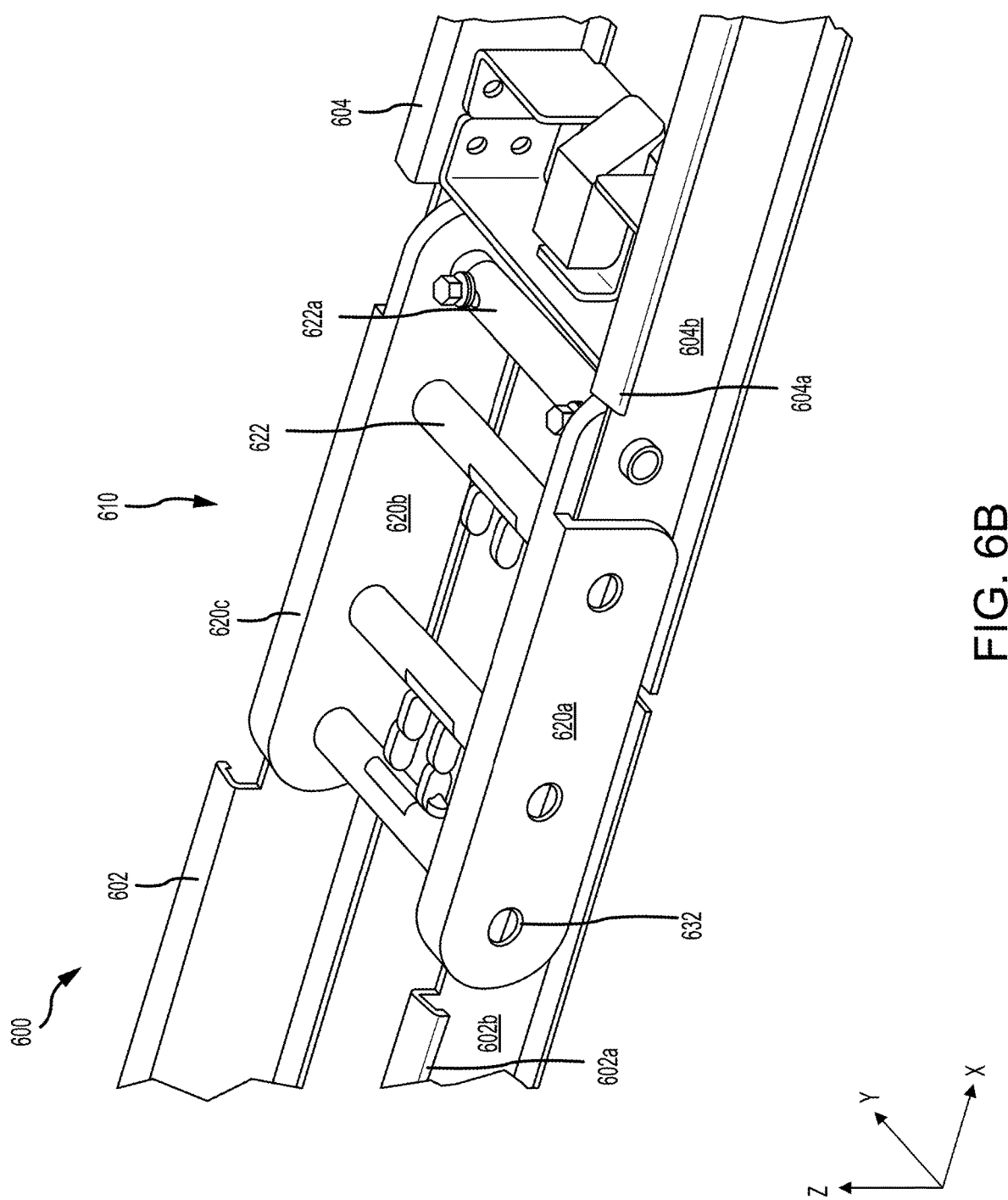
Figure 6C:
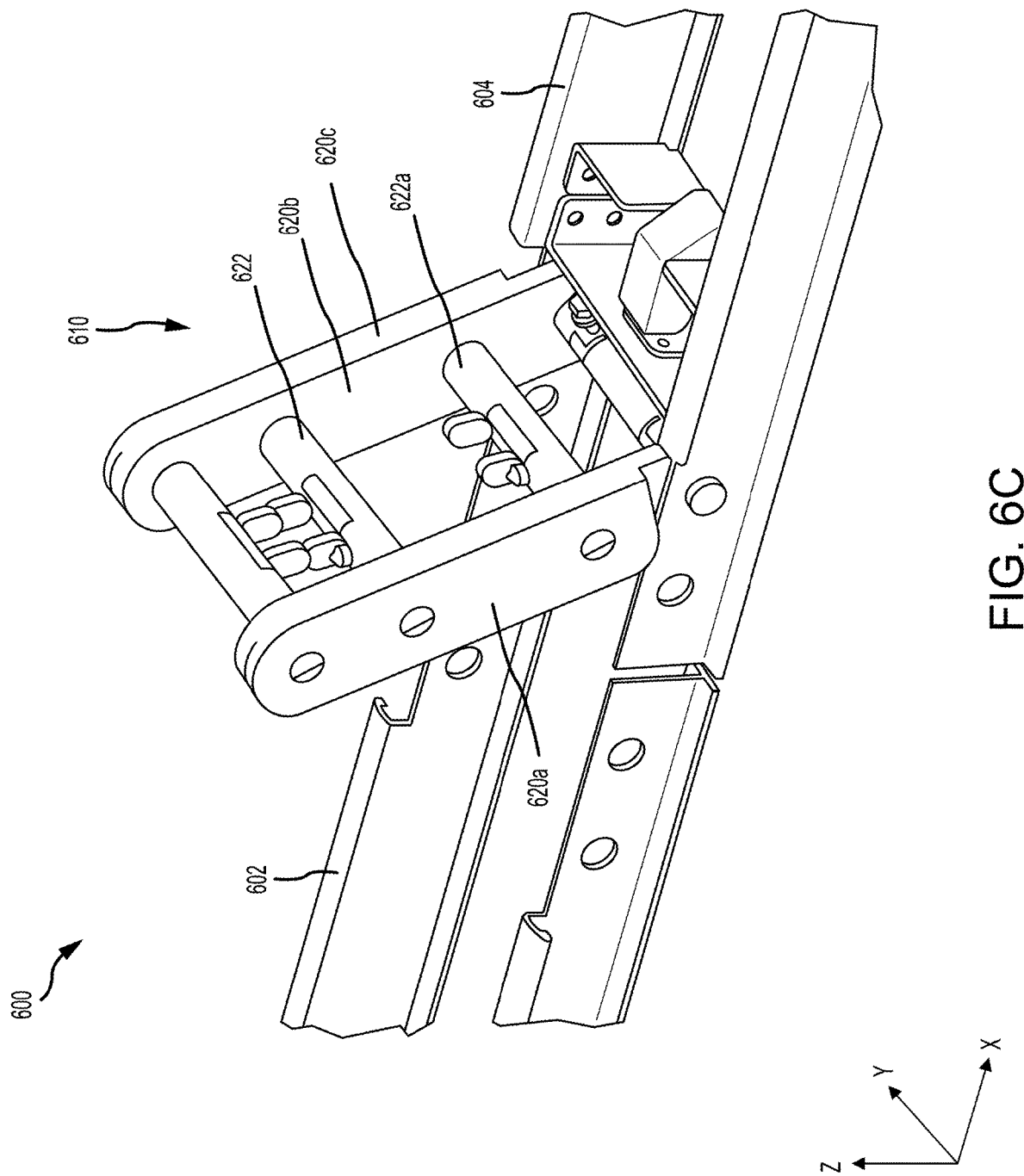

Referring now to FIGS. 6A-6C, in accordance with various embodiments, a quick-attach splice 600 is illustrated. Quick-attach splice 600 includes similar components as those described above with respect to quick-attach splice 400 with respect to FIGS. 4A and 4B, including first tray 602, second tray 604, side rails 620, cross members 622, pins 324, and tabs 326. Therefore, for simplicity, descriptions of similar components may not be repeated here in the description of quick-attach splice 600.

Side rails 620 include an outside portion 620a, an inside portion 620b, and a top portion 620c connection the outside portion 620a and the inside portion 620b. Outside portion 620b further includes holes 632 configured to receive pins 324. In this configuration, when in the lowered, or locked, position outside portion 620a is outside of first and second trays 602, 604 and inside portion 620b is inside first and second trays 602, 604. Side rails 620 provide additional lateral support (e.g., the y-direction) at attachment point between first tray 602 and second tray 604. In various embodiments, first tray 602 and second tray 604 may be modified to accommodate side rails 620. That is, a top portion 602a of first tray 602 and a top portion 604a of second tray 604 may be removed to allow side rails 620 to straddle a middle portion 602b of first tray 602 and a middle portion 604b of second tray 604. Other aspects of quick-attach splice 600 may be similar to other embodiments previously discussed.

Figure 7:
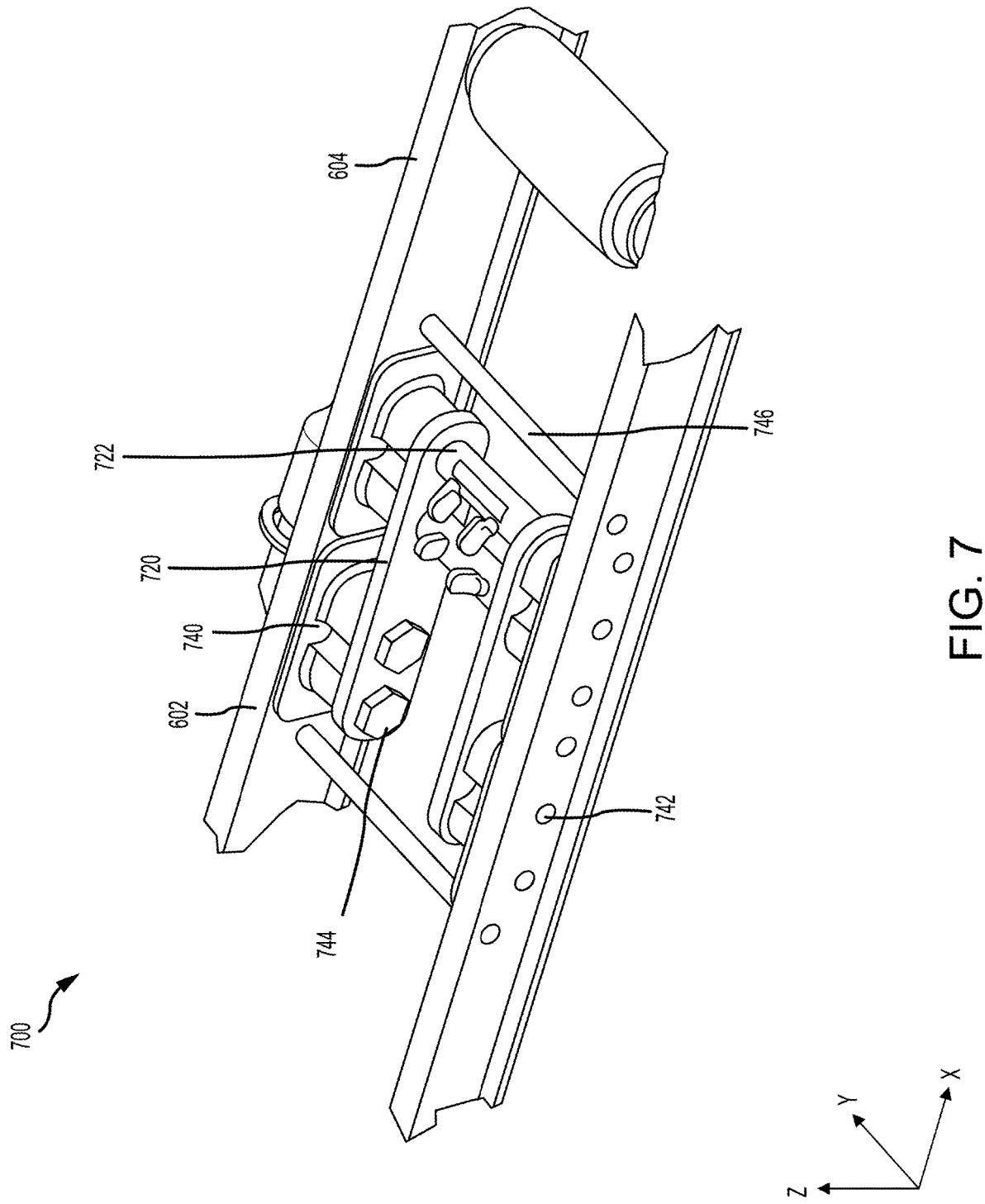
FIG. 7 illustrates a quick attach splice for a convertible cargo handling assembly, in accordance with various embodiments.

Referring now to FIG. 7, in accordance with various embodiments, a quick-attach splice 700 is illustrated. Quick-attach splice 700 includes similar components as those described above with respect to quick-attach splice 400 with respect to FIGS. 4A and 4B, including first tray 702, second tray 704, side rails 720, cross members 722, pins 324, and tabs 326. Therefore, for simplicity, descriptions of similar components may not be repeated here in the description of quick-attach splice 700.

Quick-attach splice 700 includes structures 740 that are coupled to either side first tray 702 and second tray 704. Fasteners 742 are used to couple structure 740 to an inside surface of first and second trays 702, 704. Fasteners 742 may be bolts, screws, rivets, among others. Side rails 720 are coupled to structures 740 by fasteners 744. Fasteners 744 may be bolts, screws, rivets, among others. Quick-attach splice 700 is designed for trays (e.g., second tray 704) that are removed longitudinally (e.g., the x-direction) as opposed to laterally (e.g., the y-direction). Accordingly, side rails 720 do not pivot and instead remain in a fixed horizontal position, parallel to first tray 702, as illustrated. Cross members 722 extend between side rails 720. Pins 324 extend from each side of cross member 722, through side rails 720, and into structures 740 to secure first tray 702 and second tray 704 to each other. Squeezing a pair of tabs 326 together (e.g., toward the center of cross member 722) retracts pins 324 and allows second tray 704 to be removed longitudinally (e.g., the x-direction) or vertically (e.g., the z-direction).

Quick-attach splice 700 further includes support rods 746 that are affixed to first and second trays 702, 704. Each support rod 746 extends within a tray (e.g., first tray 702 or second tray 704) to provide structure support. Support rods 746 hold the sides of first and second tray 702, 704 together to prevent bowing when under load, which may cause one or more pins 324 to unintentionally release from structure 740.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A tray connector, comprising:
   a first side rail;
   a second side rail, parallel to the first side rail;
   a cross member extending from the first side rail to the second side rail;
   a pin extending from within the cross member and through the first side rail;
   a tab configured to retract the pin; and
   a second cross member extending from the first side rail to the second side rail, the second cross member being disposed vertically lower on the first side rail than the cross member.

2. The tray connector of claim 1, further comprising:
   a base including a base plate and a side structure; and
   a hole formed in the side structure and configured to receive the pin.

3. The tray connector of claim 2, further comprising:
   a second pin extending from within the second cross member, through the first side rail, and into the hole, wherein the first side rail pivots about the second cross member.

4. The tray connector of claim 1, wherein the tab is a spring-loaded tab biasing the pin to the extended position.

5. The tray connector of claim 1, wherein the first side rail further comprises:
   an inside portion;
   an outside portion; and
   a top portion connecting the inside portion and the outside portion, wherein there is a gap between the inside portion and the outside portion.

6. The tray connector of claim 1, further comprising:
   a second pin extending from within the cross member and through the second side rail.

7. A cargo handling system, comprising:
   a first tray having a first end;
   a second tray having a second end;
   a connector configured the connect the first end to the second end, the connector including:
   a first side rail;
   a second side rail, parallel to the first side rail;
   a cross member extending between the first side rail and the second side rail;
   a pin extending from within the cross member and through the first side rail;
   a tab configured to retract the pin;
   a second cross member extending from the first side rail to the second side rail, the second cross member disposed vertically below the cross member; and
   a second pin extending from within the second cross member and through the first side rail; and
   a hole in a sidewall of the first tray, wherein the pin is configured to extend through the hole.

8. The cargo handling system of claim 7, further comprising:
   a base including a base plate and a side structure, the base plate disposed between a first side wall and an opposing second side wall of the first tray; and
   a hole in the side structure configured to receive the pin.

9. The cargo handling system of claim 7, further comprising:
   a second hole in the sidewall of the first tray, the second hole being disposed vertically below the hole, wherein the second pin is configured to extend through the second hole.

10. The cargo handling system of claim 7, wherein the first side rail further comprises:
    an inside portion;
    an outside portion; and a top portion connecting the inside portion and the outside portion, the first side rail configured to straddle a sidewall of the first tray.

11. The cargo handling system of claim 7, wherein the pin is configured to lock into the first tray and the second pin is configured to lock into the second tray.

12. A cargo handling system, comprising:
    a first tray having a first end;
    a second tray having a second end; and
    a connector configured to connect the first end to the second end, the connector including:
        a first base structure coupled to a sidewall of the first tray;
        a second base structure coupled to a sidewall of the second tray; and
        a side rail having a first end and a second end, the first end coupled to the first base structure and the second end releasably coupled to the second base structure;
        a cross member orthogonally coupled to the side rail;
        a pin extending from the cross member, through the side rail, and into the second base structure; and
        a support rod extending between the sidewall of the first tray and an opposing second sidewall of the first tray.

13. The cargo handling system of claim 12, further comprising:
    a third base structure coupled to a second sidewall of the second tray, the second sidewall of the second tray opposing the sidewall of the second tray; and
    a second side rail coupled to the third base structure, the cross member extending from the second side rail to the side rail.

14. The cargo handling system of claim 13, the connector further comprising:
    a second pin extending from within the cross member, through the second side rail, and into the third base structure.

15. The cargo handling system of claim 14, the connector further comprising:
    a first spring-loaded tab configured to retract the pin into the cross member; and
    a second spring-loaded tab configured to retract the second pin into the cross member.

* * * * *